Sept. 26, 1944.  L. J. ENGEL  2,359,210
BORING AND CUTTING TOOL
Filed Oct. 1, 1942
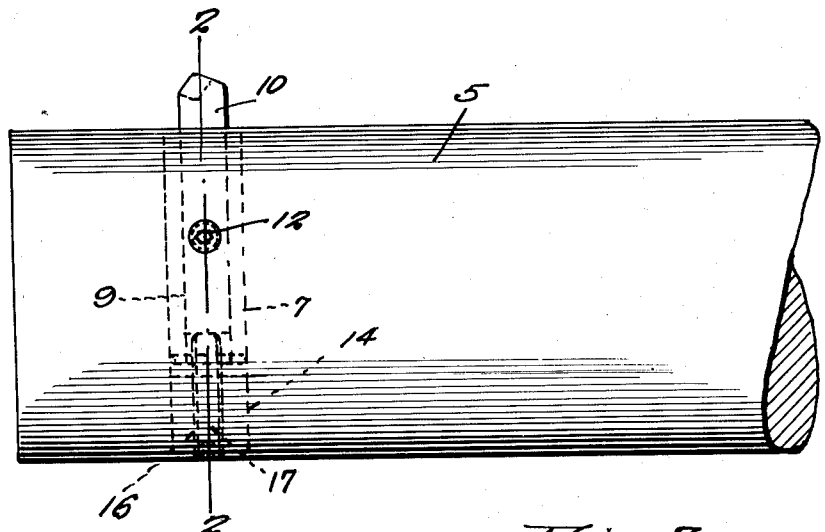
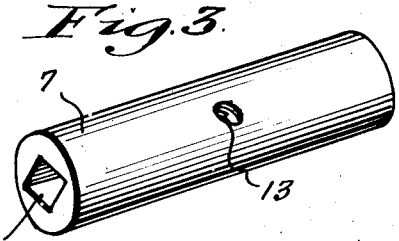
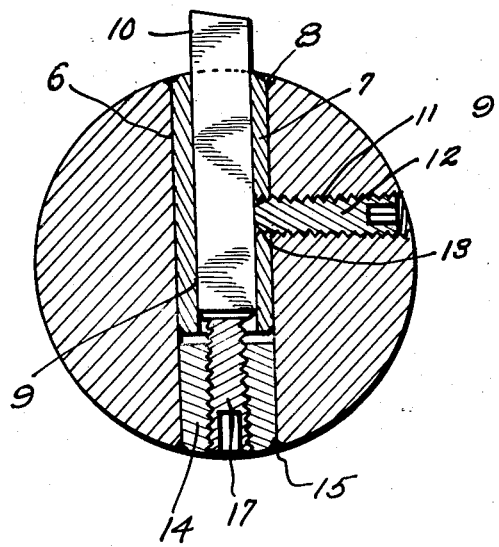
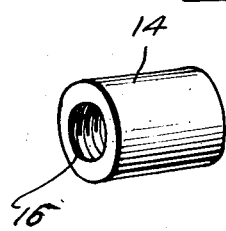
Inventor
Leonard J. Engel
By Clarence A. O'Brien
and Harvey B. Jacobson
Attorneys Patented Sept. 26, 1944

2,359,210

UNITED STATES PATENT OFFICE 2,359,210

BORING AND CUTTING TOOL

Leonard J. Engel, East Moline, Ill., assignor of one-half to Harry Wright, Moline, Ill.

Application October 1, 1942, Serial No. 460,446

1 Claim. (Cl. 77—56)

The present invention relates to new and useful improvements in boring and cutting tools adapted for use with lathes and similar types of machinery and has for its primary object to provide simple and practical means for securing the tool bit in position in the boring bar.

Other objects and advantages will become apparent from the following detailed description, reference being had to the accompanying drawing forming part hereof, wherein like numerals refer to like parts throughout and in which:

Figure 1 is a fragmentary side elevational view of a boring bar constructed in accordance with my invention.

Figure 2 is a transverse sectional view taken substantially on a line 2—2 of Figure 1.

Figure 3 is a perspective view of the bushing for the tool bit, and

Figure 4 is a similar view of the bushing for the adjusting screw.

Referring now to the drawing in detail wherein for the purpose of illustration I have disclosed a preferred embodiment of the invention the numeral 5 designates a boring bar of conventional construction and in which a transversely extending bore 6 is formed adapted for receiving a bushing 7 which extends throughout the greater portion of the bore 6 and is secured therein by welding or the like 8.

The bushing 7 is formed with a square bore 9 in which the tool bit 10 is slidably positioned with the cutting end of the tool projecting laterally from the boring bar.

A threaded bore 11 is also formed in the boring bar 5 at right angles to the bore 6 for receiving a set screw 12 which passes through an opening 13 formed at an intermediate portion of the bushing 7 for engaging the tool bit to secure the same in adjusted position.

Also fitted in one end of the bore 6 is a bushing 14 likewise secured in position by welding or the like indicated at 15. The bushing 14 is formed with a threaded bore 16 for receiving a set screw 17 adapted for engaging the inner end of the tool bit 10 for adjusting the same in the boring bar.

By providing the square-shaped bore 9 in the bushing in the bore of the boring bar it is believed the construction of the boring bar has been considerably simplified, as well as providing means for renewing or replacing the bushing should the same become necessary.

It is believed the details of construction, advantages and manner of use of the device will be readily understood from the foregoing without further detailed explanation.

Having described the invention, what is claimed as new is:

A boring bar having a circular bore transversely thereof, a cylindrical bushing secured in the bore and having a bore of non-circular shape in cross section adapted for slidably receiving a tool bit projecting laterally from the bar at one end of the bushing, a second cylindrical bushing secured in the bore of the bar and having a threaded bore therein the outer ends of the bushings being welded to the bar, an adjusting screw in the threaded bore engaging the inner end of the bit, and adapted to project the bit said bar also having a threaded bore at right angles to the first bore and said first bushing having a lateral opening aligned with the last-named bore, and a set screw in said last-named bore and adapted to enter the lateral opening of the first named bushing to secure the bit against outward movement.

LEONARD J. ENGEL.